Jan. 15, 1957

M. G. HANDSCHIN

TELEPHONOGRAPH WITH DEVICE FOR REPETITION OF ANNOUNCEMENTS

Filed Dec. 31, 1951

2,777,899

INVENTOR,

M.G. Handschin

By Bryant & Lowry attys.

United States Patent Office 2,777,899

Patented Jan. 15, 1957

2,777,899

TELEPHONOGRAPH WITH DEVICE FOR REPETITION OF ANNOUNCEMENTS

Max G. Handschin, Kusnacht, near Zurich, Switzerland, assignor to Promundo, Schaan, Liechtenstein, a firm Application December 31, 1951, Serial No. 264,319

4 Claims. (Cl. 179—6)

In one design of a telephonograph with a device for the arbitrary initiation of the repetition by the replying device, which has already become known, it is necessary for the caller to make use of certain signal calls in order to initiate a repetition. These calls could be single words, vowels, numbers etc., which are mainly composed only of vibrations of a definite frequency or of a definite frequency band width. These vibrations are taken through a rather complicated set of filters in the telephonograph, which is designed so that it admits only call impulses of the correct predetermined frequency. The call impulses passed through the filters energise a relay which starts off the repetition of the announcements-texts in a replying device. This telephonograph has the advantage that the remote control of reproduction, cancellation, recording, reproduction, etc. can be carried out quite arbitrarily, i. e. it is not made to follow a rigid method of operation and the caller has always complete control over his instrument. The only disadvantage is the necessity of employing a rather complicated set of filters.

In the present invention this disadvantage is avoided by providing for the arbitrary initiation of a repetition by the replying device a special switching arrangement with two electronic valves which responds to speech impulses of any desired frequency and of a definite minimum duration.

The attached drawing shows a possible construction in accordance with the invention.

In the following paragraphs only those parts of a telephonograph are explained which have some direct relation with the replying device and which are necessary to understand it. For the sake of simplicity all the other parts, which are already known, were not described.

Figure 1:
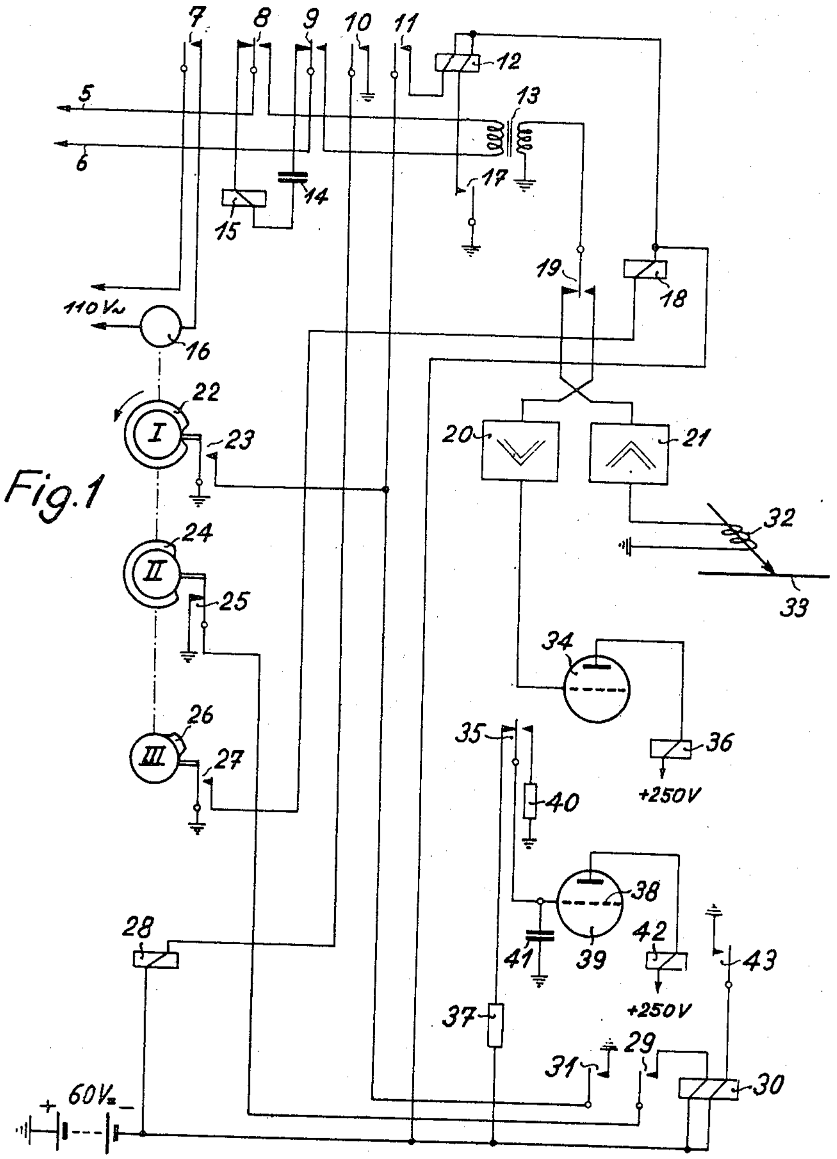
Fig. 1 is a circuit diagram of the replying device of a telephonograph.

In Fig. 1, the two lines by which the telephonograph is connected to the telephone exchange, are denoted by 5 and 6. If a call comes over these lines, the ringing current from the telephone network will energise a relay 15 over contacts 8 and 9 and a condenser 14. Relay 15 closes its contact 17 so that a closed circuit is made up of earth, contact 17, operating winding of a relay 12, and a 60 v. battery. Relay 12 now closes its contacts 7, 8, 9, 10 and 11, or changes them over, where applicable. Now the lines 5, 6 are connected over the contacts 8, 9 to a repeater 13, so that the connection with the telephone network is maintained. When contact 7 is closed, motor 16 is connected to the mains and begins to rotate, while at the same time a coupling magnet 28 is operated by a circuit comprising earth, contact 10, coupling magnet 28, 60 v. battery and couples motor 16 to the cams I, II, III so that these begin to rotate in the direction indicated by the arrow. Motor 16 drives also a recording medium (tape or wire, or similar) through gearing which is not shown in the drawing. Relay 12 is now held by the circuit comprising earth, contact 23 of cam I, contact 17, holding winding of relay 12 and 60 v. battery. The caller hears the replying device through a circuit comprising earth, sound head 32 in connection with recording medium 33, output amplifier 21, contact 19 of a relay 18, repeater 13 and earth. The switching arrangement for the arbitrary initiation of a repetition by the replying device obtains the speech impulses through contact 19 of the energised relay 18 and an input amplifier 20. It comprises a first electronic valve 34 which has in its anode circuits a relay 36 which controls a change-over switch 35. In series with this change-over switch and with a resistance 37 is the control grid of a second electronic valve, normally connected through 35 and 37 to the negative pole of the 60 v. battery. But when relay 36 is energised, the control grid 38 is connected to earth through a resistance 40 so that a capacitor 41, connected to the control grid 38, can slowly discharge under the control of the resistance 40, while the control grid 38 becomes more and more positive. In the anode circuit of the electronic valve 39 a relay 42, with a contact 43, is provided. The operating winding of a relay 30, which controls two contacts 29 and 31, can be energised through contact 43.

Figure 2:
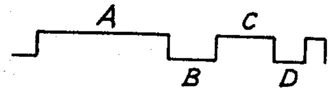
Figs. 2 shows diagrammatically by an example the method of operation of a replying device.

Fig. 2 shows diagrammatically, by an example, the method of operation of the replying device. During the interval of time marked A the transmission of a message, name, address, locality, request to speak etc. takes place. The interval of time marked B is intended for the first word of the recording. During the time denoted by C the message e. g. "further possibility" could be transmitted. The interval of time marked D corresponds to the time which the caller has at his disposal to initiate the repetition by the replying device by means of a speech impulse. During interval C, i. e. after the caller has heard the message "further possibility," contact 27 of cam III is closed by this cam. This causes relay 18 to be energised through the circuit earth, contact 27, relay 18 and 60 v. battery, and contact 19 of relay 18 switches repeater 13 from the output amplifier 21 over to the input amplifier 20.

The method of operation of the switching arrangement described above is as follows: If the caller pronounces a speech impulse of any desired frequency, relay 36 is energised through the circuit composed of lines 5, 6, repeater 13, contact 19, input amplifier 20, control grid of electronic valve 34, relay 36 plus 250 v. Thus, relay 36 is always excited when the caller speaks but also when disturbing noises are transmitted through the telephone line, as e. g. the busy tone, etc. These disturbing noises can also be originated by the caller, by moving the microphone, coughing, etc. or by somebody entering the room where the caller is (closing the door, etc.). These noises, too, are all transmitted and would start the replying device every time. In accordance with this invention, however, these noises which, as experience shows, are only of short duration and may take less than, say, 800 ms., are rendered ineffective by giving those speech impulses which are used to initiate the repetition by the replying device arbitrarily a duration of more than, say, 800 ms. The energised relay 36 now changes over its change-over switch 35 and connects the negatively charged capacitor 41 through resistance 40 to earth, so that it slowly begins to discharge. When the control grid 38 has become sufficiently positive, relay 42 is energised. The interval between the energisations of relay 36 and of relay 42 depends for a given capacity of capacitor 41 on the resistance of resistor 40, and can be changed by adjusting the latter. Let us assume, as an example, that this interval has a duration of 800 ms. If now the speech impulses pronounced by the caller are too short, i. e. their duration is less than 800 ms., then relay 36 releases before relay 42 has operated and condenser 41 is immediately charged negatively again. Consequently, the repetition by the replying device will not take place. If, however, the caller pronounces speech impulses which last longer than 800 ms., then it is obvious that relay 42 will respond and close its contact 43 in the circuit composed of earth, contact 43, operating winding of relay 30, and 60 v. battery. Relay 30 is now excited through contact 43 and is held immediately through contact 25 of cam plate II and its holding contact 29, while contact 31 of relay 30 holds relay 12 through the circuit comprising earth, contact 31, contact 11, holding winding of relay 12, and 60 v. battery. While cam plate I is opening its contact 23 (zero position or initial position of replying device) relay 12 is held through contact 31. The replying-device continues to run because relay 12 remains energised and the caller hears in the usual manner the text recorded during the interval A (see Fig. 2).

The caller can now initiate the repetition in the usual manner by pronouncing code words. As soon as cam plate I has left the zero position, contact 23 is closed again and takes over the task of holding relay 12, while relay 30 again becomes dead as soon as cam plate II opens its contact 24. If the caller does not pronounce a speech impulse in the time interval D (see Fig. 2), relay 30 is not excited and relay 12 becomes dead as soon as contact 23 of cam plate I opens. The replying device is again in the initial position. All circuits become dead and the lines 5, 6 are disconnected from the repeater 13 and connected to relay 15.

The switching arrangement in accordance with the invention has that advantage over the filter devices that the construction of the telephonograph provided with this replying device is very much simplified, while at the same time the functional reliability reaches an optimum because there are no complicated filter arrangements to get out of order.

While the invention has been described in detail with respect to a now preferred example and embodiment of the invention, it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a telephonograph including a message recording device and a replying device, a repetition device for the arbitrary initiation of a repetition by the replying device comprising in combination, electronic valve controlled switching means connected to control initiation of said repetition device, time-delay means for delaying actuating of said switching means a predetermined time interval, and sound-actuated switching means for controlling the operation of said valve-controlled switching means through said time delay means in response to an incoming speech signal of a duration exceeding said predetermined time interval, whereby only an incoming speech signal of minimum predetermined duration is required to initiate a repetition by the reply device.

2. A telephonograph according to claim 1, wherein said time-delay means includes a resistance-capacitor combination in the grid circuit of said valve-controlled means arranged to discharge the grid bias from inoperative to operative potential, said sound-actuated switching means being connected to control said discharge.

3. A telephonograph according to claim 2, and a second valve controlling the circuit of said sound-actuated switching means through a speech amplifier connected to the incoming circuit.

4. The invention according to claim 3, said resistance-capacitor combination being adjustable so that the operating delay can be regulated.

References Cited in the file of this patent

UNITED STATES PATENTS

| | | |
|---|---|---|
| 2,171,366 | Hipple | Aug. 29, 1939 |
| 2,519,568 | Handschin | Aug. 22, 1950 |
| 2,537,406 | Handschin et al. | Jan. 9, 1951 |
| 2,537,407 | Handschin et al. | Jan. 9, 1951 |